US007269100B2

(12) United States Patent
Gilomen

(10) Patent No.: US 7,269,100 B2
(45) Date of Patent: Sep. 11, 2007

(54) ELECTRONIC DIVE WATCH INCLUDING A REDUNDANT INSTANTANEOUS DEPTH DISPLAY

(75) Inventor: Beat Gilomen, Grenchen (CH)

(73) Assignee: ETA SA Manufacture Horlogère Suisse, Grenchen (CH)

(*) Notice: Subject to any disclaimer, the term of this patent is extended or adjusted under 35 U.S.C. 154(b) by 0 days.

(21) Appl. No.: 11/461,100

(22) Filed: Jul. 31, 2006

(65) Prior Publication Data

US 2007/0025186 A1 Feb. 1, 2007

(30) Foreign Application Priority Data

Jul. 29, 2005 (EP) .................................. 05107040

(51) Int. Cl.
*G04B 47/06* (2006.01)
*G04B 19/04* (2006.01)
*G01F 23/00* (2006.01)

(52) U.S. Cl. .............................. 368/11; 368/80; 73/299

(58) Field of Classification Search .................. 368/10, 368/11

See application file for complete search history.

(56) References Cited

U.S. PATENT DOCUMENTS

| | | | | |
|---|---|---|---|---|
| 4,470,707 | A * | 9/1984 | Chambon et al. | 368/74 |
| 4,783,772 | A * | 11/1988 | Umemoto et al. | 368/11 |
| 5,224,059 | A * | 6/1993 | Nitta et al. | 73/384 |
| 6,490,230 | B1 * | 12/2002 | Sakuyama et al. | 368/11 |
| 6,791,903 | B2 * | 9/2004 | Germiquet et al. | 368/11 |
| 6,842,402 | B2 * | 1/2005 | Germiquet et al. | 368/10 |

FOREIGN PATENT DOCUMENTS

| | | |
|---|---|---|
| EP | 0 581 957 A1 | 2/1994 |
| EP | 1 396 766 A1 | 3/2004 |
| EP | 1 396 767 A1 | 3/2004 |
| EP | 1 571 506 A1 | 9/2005 |
| EP | 1 571 507 A1 | 9/2005 |

OTHER PUBLICATIONS

European Search Report issued in corresponding application No. 05 10 7040 completed Feb. 28, 2006.

* cited by examiner

*Primary Examiner*—Vit W. Miska
(74) *Attorney, Agent, or Firm*—Griffin & Szipl, P.C.

(57) ABSTRACT

The present invention proposes an electronic dive watch (10) including a water resistant case (12) containing a watch movement (15) on which there is mounted a dial (16) provided with at least one first and one second coaxial hand (18, 20), each hand (18, 20) being driven independently by an associated motor (32, 34), of the type wherein the watch movement (15) includes an electronic circuit (30) that controls the first and second hands (18, 20) in accordance with a first operating mode in which each hand (18, 20) indicates a distinct item of data and in accordance with a second operating mode, called the dive mode, in which at least the first hand (18, 20) indicates an instantaneous depth value (Pi), characterized in that, in the dive mode, the first and second hands (18, 20) are controlled such that they simultaneously indicate the same instantaneous depth value.

7 Claims, 3 Drawing Sheets

ELECTRONIC DIVE WATCH INCLUDING A REDUNDANT INSTANTANEOUS DEPTH DISPLAY

This application claims priority from European Patent Application No. 05107040.7, filed Jul. 29, 2005, the entire disclosure of which is incorporated herein by reference.

FIELD OF THE INVENTION

The present invention concerns an electronic watch including dive-dedicated functions.

More specifically, the electronic dive watch according to the present invention is of the type including a water resistant case containing a watch movement on which there is mounted a dial provided with at least one first and one second coaxial hand, each hand being driven independently by an associated motor, of the type where the watch movement includes an electronic circuit that controls the first and second hands in accordance with a first operating mode in which each hand indicates a distinct item of data and in accordance with a second operating mode, called the dive mode, in which at least the first hand indicates an instantaneous depth value.

BACKGROUND OF THE INVENTION

A watch of this type is disclosed for example in EP Patent No, 1 396 766 A, incorporated herein by reference. In this type of watch, wherein a hand is used to display the instantaneous depth, a horological type stepping motor, called a Lavet motor, is generally used to drive the hand in rotation about its axis. However, the watch might lose motor steps, for example after the watch has been subject to shocks, i.e. there is a step shift between the electronic counter and the angular position of the hand. This phenomenon causes desynchronisation between the motor and the electronic control circuit, and thus an erroneous instantaneous depth display by the hand.

The instantaneous depth indication is vital to the diver. Consequently, this desynchronisation can endanger his health, since he will make the dive based on erroneous data, which could lead to him exceeding his physiological limits.

It is an object of the present invention to overcome these drawbacks.

SUMMARY OF THE INVENTION

Thus, the invention proposes a watch of the type described previously, characterized in that, in the dive mode, the first and second hands are controlled such that they simultaneously indicate the same instantaneous depth value.

Thus, the two hands indicate the instantaneous depth in a superposed manner. There is thus a redundancy in the display relating to the instantaneous depth, which allows incorrect information to be identified. For a diver, incorrect information is more serious than an absence of information. Indeed, in the event of absence of information, the driver knows that he must stop the dive or obtain the information by other means, for example by means of the drive instrument carried by another diver who is accompanying him.

Owing to the watch according to the invention, if a step shift occurs for one hand, the diver observes from the start of the dive mode that the two hands are no longer superposed for the instantaneous depth display, which enables him to detect the malfunction.

According to other features of the invention:

- the first operating mode is a time mode wherein the first and second hands display the current time;
- there is a third operating mode, called the synchronisation mode, wherein the electronic circuit aligns the first and second hands radially in a determined angular position;
- the watch includes a third hand and, in dive mode, the third hand is controlled such that it indicates a data item distinct from the instantaneous depth;
- the instantaneous depth is determined from measurements made by a pressure sensor.

BRIEF DESCRIPTION OF THE DRAWINGS

Other features and advantages of the present invention will appear more clearly upon reading the following detailed description, made with reference to the annexed drawings, given by way of non-limiting examples and in which.

DETAILED DESCRIPTION OF THE ILLUSTRATIVE EMBODIMENTS

Figure 1:
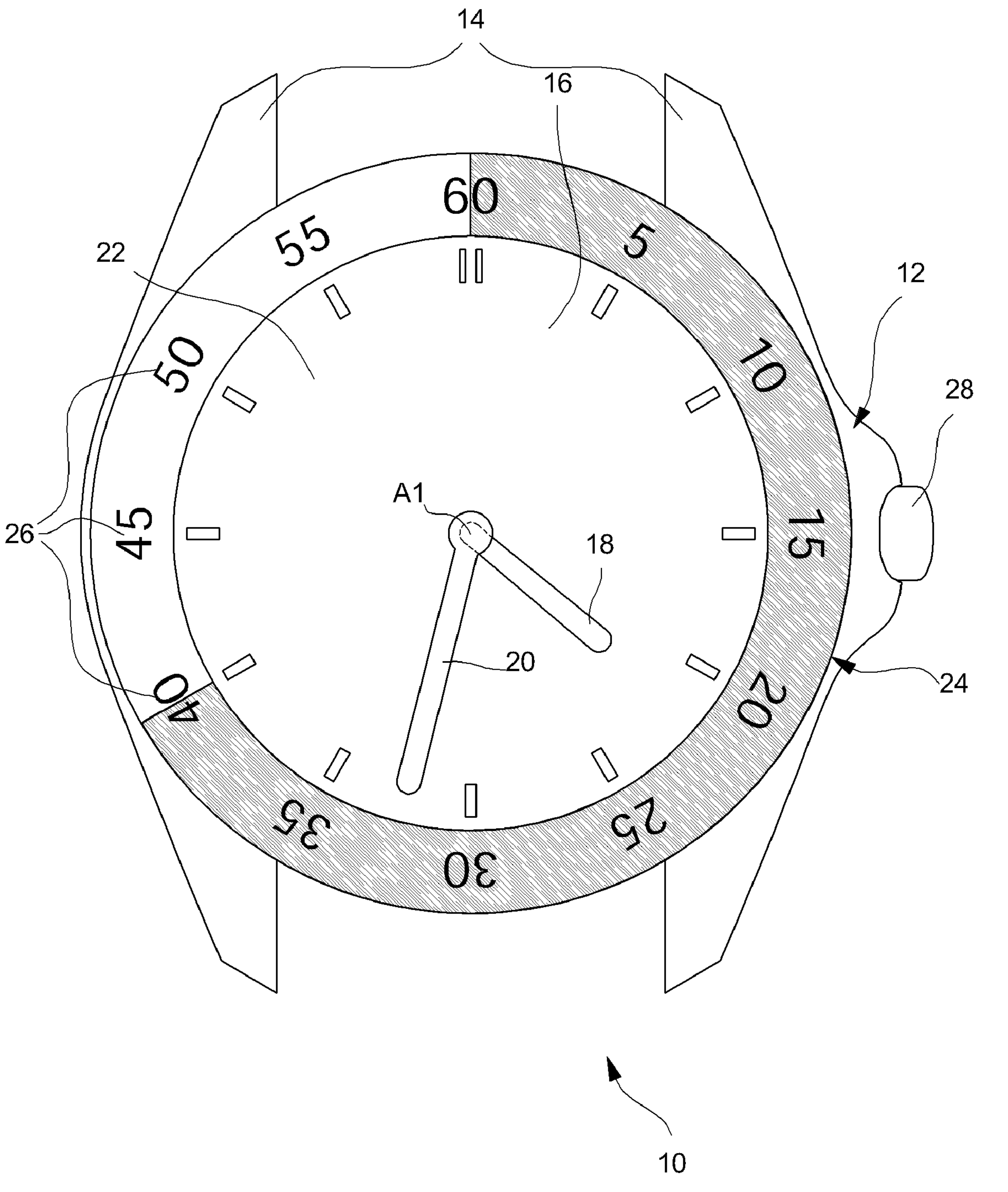
FIG. 1 is a front view which schematically shows an electronic dive watch in accordance with the teaching of the invention in time mode.

FIG. 1 shows an electronic dive watch 10 in accordance with the teaching of the present invention. Watch 10 includes a water resistant case 12 which may, for example, be of the type with a moulded plastic back cover-middle part, including horns 14 provided for attaching a wristband (not shown) and containing in particular a watch movement 15 (shown in FIG. 3), a dial 16, a first hand called the hour hand 18 and a second hand called the minute hand 20.

Hands 18, 20 are coaxial and are driven in rotation about a central axis A1.

Case 12 is closed on its top surface by a crystal 22 carrying a bezel 24 fixed to its periphery. Bezel 24 bears minute graduations 26 extending from a first five minute indication to a last sixty minute graduation, two successive graduations being space five minutes apart.

Watch 10 includes a control member 28, for example a stem-crown that can be used as a push-button in addition to its conventional use in rotation.

Figure 3:
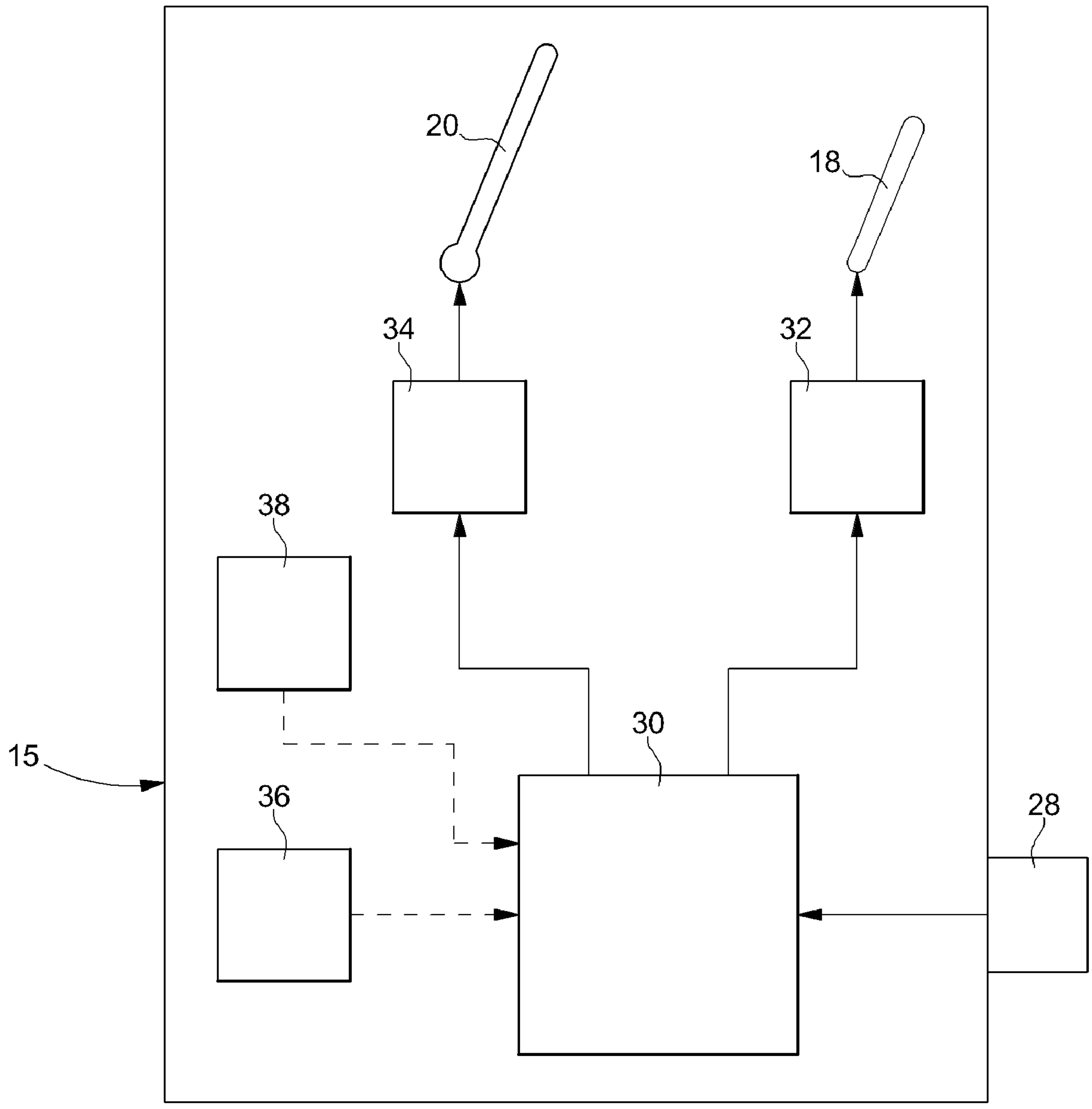
FIG. 3 is a schematic diagram which shows the watch movement of the dive watch according to the present invention.

As shown in FIG. 3, watch movement 15 includes an electronic control circuit 30 which controls the angular position of the two hands 18, 20 respectively via two associated stepping motors 32, 34. Preferably, the two motors 32, 34 are electric watch motors which allow each hand 18, 20 to be driven in both rotational directions.

Watch movement 15 also includes a pressure sensor 36 for measuring, at each moment, the pressure of the environment outside watch 10 and converting this value into an instantaneous depth value Pi during a dive. These techniques have been described in numerous documents of the prior art and will not be examined in more detail hereinafter.

Thus, suitable programming of electronic circuit 30 of watch 10 provides a first operating mode, here a time mode in which the two hands 18, 20 display the current time, as illustrated in FIG. 1, and a second operating mode, called the dive mode, in which the two hands 18, 20 display dive related information.

Manual and/or automatic selection means are provided for changing the operating mode, in particular to pass from the time mode to dive mode, at the start of a dive, and conversely when the person wearing watch 10 resurfaces. The manual selection means can be formed by control member 28 and the automatic selection means can be formed by electronic circuit 30 coupled to a detection device 38 that detects the presence of water outside case 12.

As these selection means form part of the state of the art, they will not be described further in this Patent Application, since they do not constitute the core of the present invention and those skilled in the art will not have any particular difficulty in implementing them.

In accordance with the teaching of the present invention, in dive mode, the two hands 18, 20 are used for simultaneously indicating the instantaneous depth value Pi, as a function of signals transmitted by pressure sensor 36, the two hands 18, 20 being aligned radially on the same side of axis A1.

Thus, when the diver enters the water, which activates the dive mode, the two hands 18, 20 are positioned opposite the twelve o'clock indication and zero depth, in other words opposite the sixty minute indication carried by bezel 24. When the diver descends, the two hands 18, 20 start to rotate simultaneously clockwise to indicate the instantaneous depth value Pi opposite minute graduations 26. Similarly, when the diver comes back up, the two hands 18, 20 simultaneously rotate anti-clockwise.

Figure 2:
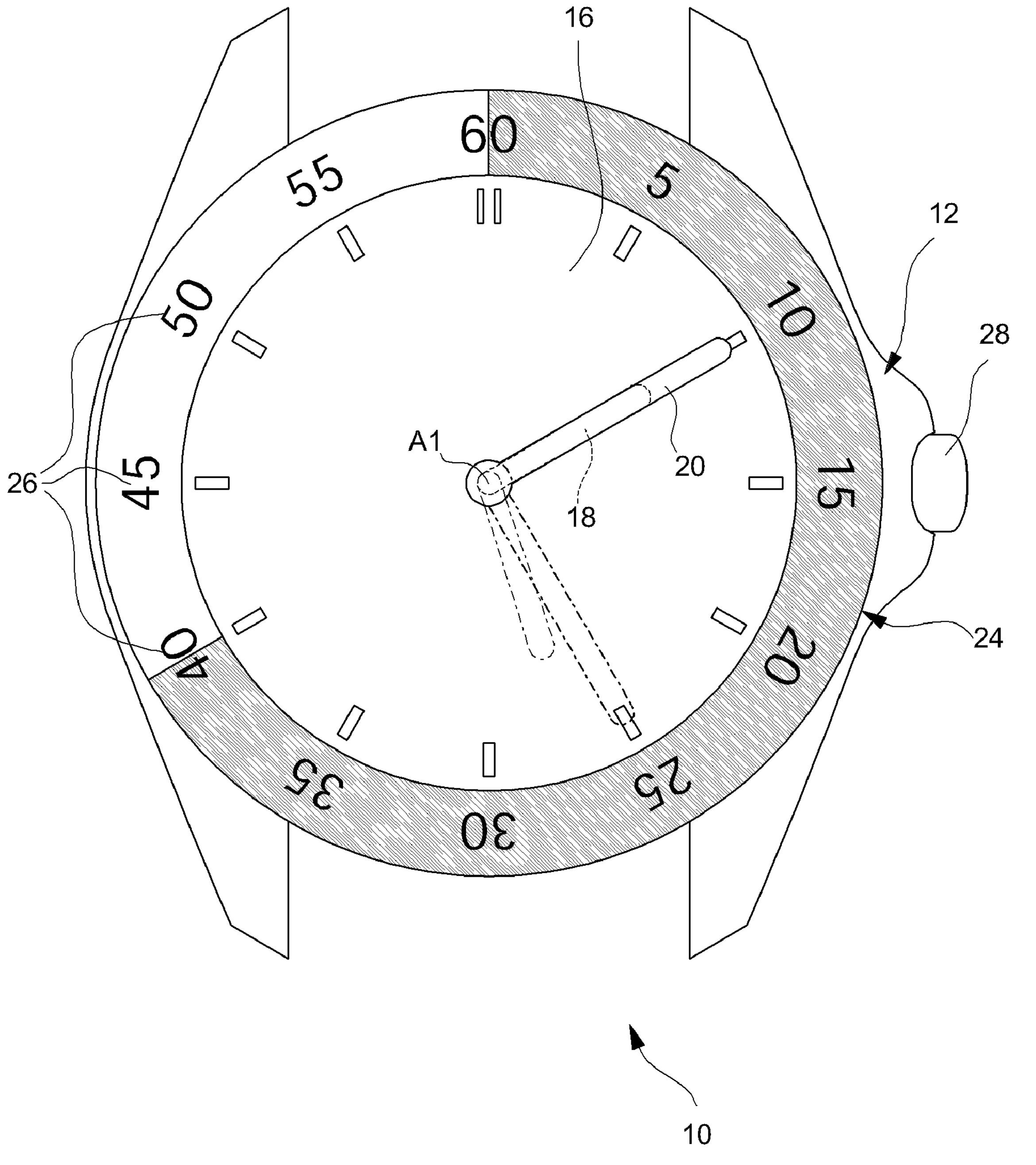
FIG. 2 is a similar view to that of FIG. 1, which shows the watch in dive mode.

In FIG. 2, watch 10 is shown in dive mode and the instantaneous depth Pi indicated by hands 18, 20 is the value ten. Hour hand 18 is shown in dotted lines as it is underneath minute hand 20, which is in a full line. Of course, dial 16 could be provided with a graduation representative of the instantaneous depth Pi, replacing or in addition to the graduations carried by bezel 24. The instantaneous depth indication scale Pi can vary and the display unit can vary, the depth could, for example be indicated in meters or feet.

It should be noted that, in normal operation, in dive mode, the diver sees a single hand (minute hand 20), which facilitates reading of instantaneous depth Pi. Moreover, as graduations 26 used for reading instantaneous depth Pi, are the same as those used for indicating the minutes, case 12 of watch 10 is not overloaded with useless indications which further facilitates the accessibility of the information provided.

If there is a step loss on one of the two motors 32, 34, for example following a shock, the two hands 18, 20 are shifted angularly in relation to each other, when instantaneous depth Pi is displayed in the dive mode, which is illustrated in dot and dash lines in FIG. 2. The diver can then see that there is a malfunction in the display of instantaneous depth Pi, and can react accordingly.

Advantageously, an additional operating mode, called the synchronisation mode, is provided for synchronising the angular position of each hand 18, 20 with the control signals of electronic circuit 30, so as to allow correction of the angular shift between hands 18, 20 in dive mode. In this synchronisation mode, electronic circuit 30 aligns the two hands 18, 20 radially, for example opposite the midday position, and the user corrects the angular shift of hands 18, 20 relative to the midday position, by activating the control member in an appropriate manner.

Of course, additional functions could be provided in dive watch 10, for example a dive history function with storage means (not shown) integrated in electronic circuit 30, or additional dive data display means such as the dive time remaining before a decompression stop is necessary, etc. Data relating to these additional functions can be displayed by means of an analogue hand, for example by means of a third hand (not shown) that displays the seconds in time mode, or by means of a digital display, for example a liquid crystal display (not shown). Moreover, a display screen of this type can be used for also displaying instantaneous depth Pi, in parallel with the indication of instantaneous depth Pi by hands 18, 20, which enables the user to determine which is the proper value of instantaneous depth Pi when he observes an angular shift between hands 18, 20.

According to the embodiment described and shown, the first operating mode is a time mode. According to an alternative embodiment (not shown), the two hands 18, 20 indicate distinct data different from the current time, in the first operating mode, for example the date. The current time is then displayed by other, analogue or digital means.

According to an alternative embodiment (not shown) of the invention, the zero depth indication could be arranged in a different angular position on dial 16, for example at eight o'clock. This configuration would have the advantage of differentiating the zero instantaneous depth position from the synchronisation position of hands 18, 20 at midday.

What is claimed is:

1. An electronic dive watch including a water resistant case containing a watch movement on which there is mounted a dial provided with at least one first and one second coaxial hand, each hand being driven independently by an associated motor, of the type wherein the watch movement includes an electronic circuit that controls the first and second hands in accordance with a first operating mode in which each hand indicates a distinct item of data and in accordance with a second operating mode, called the dive mode, in which at least the first hand indicates an instantaneous depth value, wherein, in the dive mode, the first and second hands are controlled such that they simultaneously indicate the same instantaneous depth value, both hands rotating simultaneously in the same direction when the instantaneous depth changes.

2. The electronic watch according to claim 1, wherein the first operating mode is a time mode in which the first and second hands indicate the current time.

3. The electronic watch according to claim 1, wherein a third operating mode, called the synchronisation mode, is provided, in which the electronic circuit aligns the first and second hands radially in a determined angular position.

4. The electronic watch according to claim 1, wherein the watch includes a third hand and wherein, in the dive mode, the third hand is made to indicate a data item distinct from the instantaneous depth.

5. The electronic watch according to claim 1, wherein the instantaneous depth is determined from measurements made by a pressure sensor.

6. The electronic watch according to claim 1, wherein a digital display is provided that displays the instantaneous depth in parallel to the display of the instantaneous depth by the hands.

7. The electronic watch according to claim 2, wherein a third operating mode, called the synchronisation mode, is provided, in which the electronic circuit aligns the first and second hands radially in a determined angular position.

* * * * *